United States Patent [19]
Vardakas et al.

[11] Patent Number: 5,383,187
[45] Date of Patent: Jan. 17, 1995

[54] ADAPTIVE PROTOCOL FOR PACKET COMMUNICATIONS NETWORK AND METHOD

[75] Inventors: George M. Vardakas, Alpine; Jason C. Erickson, Encinatas, both of Calif.

[73] Assignee: Hughes Aricraft Company, Los Angeles, Calif.

[21] Appl. No.: 950,260

[22] Filed: Sep. 18, 1992

[51] Int. Cl.$^6$ ............................................. H04J 3/24
[52] U.S. Cl. ................................. 370/94.3; 370/94.1; 340/825.02
[58] Field of Search ....................... 370/94.1, 94.3, 60, 370/97, 953, 95.1, 85.8, 95.2; 455/7, 11.1, 16, 18, 54.1, 56.1, 53.1; 340/825.02, 825.04, 825.44, 825.47, 825.52

[56] References Cited

U.S. PATENT DOCUMENTS

| | | | |
|---|---|---|---|
| 4,627,052 | 12/1986 | Hoare et al. | 370/94.1 |
| 4,882,765 | 11/1989 | Maxwell et al. | 455/11.1 |
| 4,905,231 | 2/1990 | Leung et al. | 370/94.1 |
| 5,168,498 | 12/1992 | Adams et al. | 370/94.1 |

Primary Examiner—Douglas W. Olms
Assistant Examiner—Ajit Patel
Attorney, Agent, or Firm—W. K. Denson-Low

[57] ABSTRACT

A method for routing data through a packet communications network including the steps of generating a concatenated data packet containing a plurality of messages for transmission to a plurality of radios in the network, appending a first set of assignment commands and destination codes to the concatenated data packet, and transmitting the concatenated data packet to a first set of radios of the plurality of radios in a single transmission. The method further includes the steps of extracting messages from the concatenated data packet for the first set of radios, appending a second set of assignment commands and destination codes to the concatenated data packet, and relaying the concatenated data packet to a second set of radios of the plurality of radios in a single transmission. In a preferred embodiment, the adaptive protocol for packet communications network of the present invention forms the concatenated data packet in a headend radio. The data packet includes the set of codes for the first set of radios directly communicating with the headend radio. The data packet is transmitted to the first set of radios in a single transmission during each frame. Messages having a destination code for a radio of the first set of radios are extracted and sent to a host device serving the first set of radios. The data packet is reformatted to include the second set of codes and is retransmitted to the second set of radios in a single transmission.

17 Claims, 6 Drawing Sheets

ADAPTIVE PROTOCOL FOR PACKET COMMUNICATIONS NETWORK AND METHOD

BACKGROUND OF THE INVENTION

1. Field of the Invention

The present invention relates to communications systems. More specifically, the present invention relates to methods and apparatus for routing data packets through a packet communications network.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Packet communication networks are known in the art and can support a central control site that is used to control and monitor a plurality of remote sites. The central control site can be comprised of a computer to perform controlling and monitoring functions. The remote sites can include microprocessor based systems that perform monitoring and control of local equipment. An example of a system that is suitable for incorporating a packet communication network is a traffic light system. The control function of the central control site might be the coordinated timing of multiple traffic lights in an area while the control function of the remote site might be the control of a single traffic light.

The function of a packet communication network is to support the transmission of binary data or messages between computers. The messages are routed through a network where a network is defined as an arbitrary arrangement of radios. Routing of the messages is accomplished through available radio frequency (RF) links between points in the network. Each radio within the packet communication network maintains a data base that allows the radio to relay all received messages to a further destination along the most direct path. The routing of a message by a radio along the path serves as a relay since the message is received, processed and retransmitted to a further radio destination. This function is referred to as store and forward relaying and is accomplished by a method known as the Minimum Hop Approach. The Minimum Hop Approach involves an algorithm that is employed to determine the shortest path between two points, e.g., network radios. The Minimum Hop Approach and the associated algorithm are known in the art and can be found in a textbook entitled *Telecommunication Networks* by Mischa Schwartz published by Addison-Wesley, copyright 1987.

In general, packet communication networks are a form of data communications in which data packets are routed between central control and a remote station. Error checksum and receipt verification methods can also be incorporated. Several methods of data packet routing are known in the art. According to one method, the address in the header of the data packet is used as an index to a directory of packet routing lists. Packet routing lists must be prepared with knowledge about the location of each radio in the network. Each radio is identified by a header code or bit and a packet routing list consists of an ordered list of radio header bits or call signs. Directory-based routing techniques require continued maintenance and communication of the network interconnectivity information employed in the directory. Each of these functions drains the resources of the network and can become unmanageable in a large network.

Another basic technique of routing data packets through packet communication networks is nondirectory-based. In nondirectory-based routing, the complexities associated with routing techniques are avoided. The construction of the network is simplified since there is no connectivity information. However, nondirectory-based routing techniques do not permit network parameter optimization as do the directory-based routing techniques.

Two basic architectures of packet communication networks are known. In an earlier design, a central control computer transmitted data packets to and received monitoring information from the individual remote radios. A major problem associated with this network is time limitation. The data packet must be received and processed, the most direct path to a destination radio must be identified and then the data packet must be retransmitted to hundreds of remote radios at the rate of one message at a time once per second. Because of this delay, packet communication networks are unable to support rapid communications systems.

In a more current design, packet communication networks are optimized for communications in which any remote radio can communicate with any other remote radio. Further, current designs provide the ability to network communications over a large geographical area with line-of-sight remote radios. However, several disadvantages exist with the current design of packet communication networks. First, the radio design requires on the order of one second per relay hop to transmit a data packet from one remote radio to another. Second, each message of the data packet must be handled as a separate transaction, e.g., on a message-by-message basis. In support of the control and monitoring functions, each message from the central control computer must be handled independently from the other messages. Third, the radio is unable to concatenate multiple messages into a single packet where each message has a different destination.

Radio technology employed in the past exhibited very slow switching times when transferring between the receive and transmit modes. The switching times of analog components such as a transceiver were on the order of many milliseconds. Therefore, tens-to-hundreds of milliseconds of radio switching time were lost during the relaying of the data packets. Spread spectrum radio technology is now commercially available. This technology is provided with improved radio switching times on the order of one millisecond. Notwithstanding the faster switching times available in the advanced radio technology, the previously described problems continue to inhibit the performance of packet communication networks.

Thus, there is a need in the art for improvements in routing data packets through packet communication networks.

SUMMARY OF THE INVENTION

The need in the art is addressed by the adaptive protocol for packet communications network and method of the present invention. The invention is a method for routing data through a packet communications network including the steps of generating a concatenated data packet containing a plurality of messages for transmission to a plurality of radios in the network, appending a first set of assignment commands and destination codes to the concatenated data packet, and transmitting the concatenated data packet to a first set of radios of the plurality of radios in a single transmission. The method further includes the steps of extracting messages from the concatenated data packet for the first set of radios, appending a second set of assignment commands and destination codes to the concatenated data packet, and relaying the concatenated data packet to a second set of radios of the plurality of radios in a single transmission.

In a preferred embodiment, the adaptive protocol for packet communications network of the present invention forms the concatenated data packet in a headend radio. The data packet includes the set of codes for the first set of radios directly communicating with the headend radio. The data packet is transmitted to the first set of radios in a single transmission during each frame. Messages having a destination code for a radio of the first set of radios are extracted and sent to a host device serving the first set of radios. The data packet is reformatted to include the second set of codes and is retransmitted to the second set of radios in a single transmission.

BRIEF DESCRIPTION OF THE DRAWINGS

FIGS. 4b and 4c show transmission timing diagrams of the prior art and of the adaptive protocol for a communications network of the present invention, respectively, for the exemplary connection shown in FIG. 4a.

DESCRIPTION OF THE INVENTION

Figure 1:
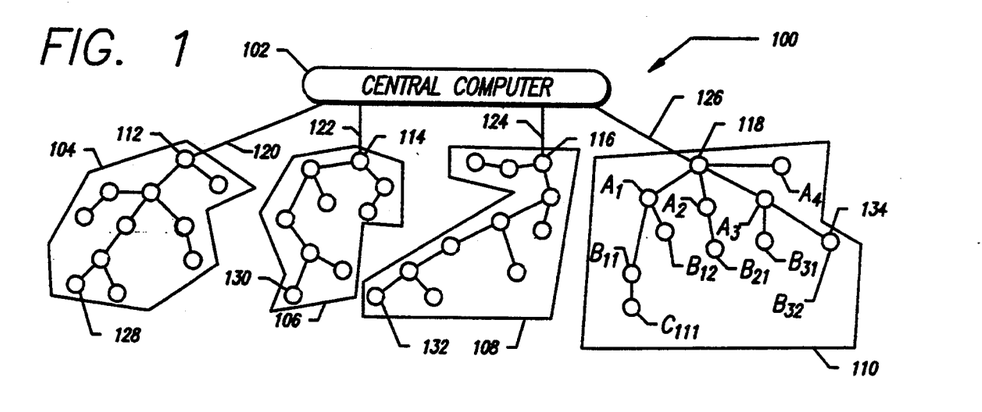
FIG. 1 is a simplified communications diagram of an illustrative embodiment of an adaptive protocol for communications network of the present invention showing a central computer connected to a headend radio and a plurality of remote radios of several cells.

A diagram illustrating the communications architecture of the adaptive protocol for a packet communications network 100 is shown in FIG. 1. The network 100 includes a central computer 102 and a plurality of network cells 104, 106, 108 and 110. Each of the network cells 104, 106, 108 and 110 includes a headend radio 112, 114, 116, 118, respectively. Each of the headend radios 112, 114, 116 and 118 is connected to the central computer 102. The connection between the central computer 102 and the individual headend radios 112, 114, 116 and 118 can be facilitated by a plurality of cables 120, 122, 124 and 126, respectively.

Connected to each of the headend radios 112, 114, 116 and 118 in the respective network cells 104, 106, 108 and 110 is a corresponding plurality of remote radios (e.g., field radios) 128, 130, 132 and 134, respectively, as shown in FIG. 1. The function of the central computer 102 is to control and monitor the plurality of sites (e.g., for example, traffic lights) connected to remote radios 128, 130, 132 and 134. Assignment decisions are made at the headend radios 112, 114, 116 and 118 based upon command data generated by the central computer 102. The assignment decisions are then transmitted to the remote radios 128, 130, 132 and 134 in the form of messages via the respective headend radio 112, 114, 116 and 118. Each of the headend radios 112, 114, 116 and 118 serves to relay the messages between the central computer 102 and the respective network cells 104, 106, 108 and 110. The messages are thereafter received and acted upon by the remote radios 128, 130, 132 and 134.

Figure 5A:
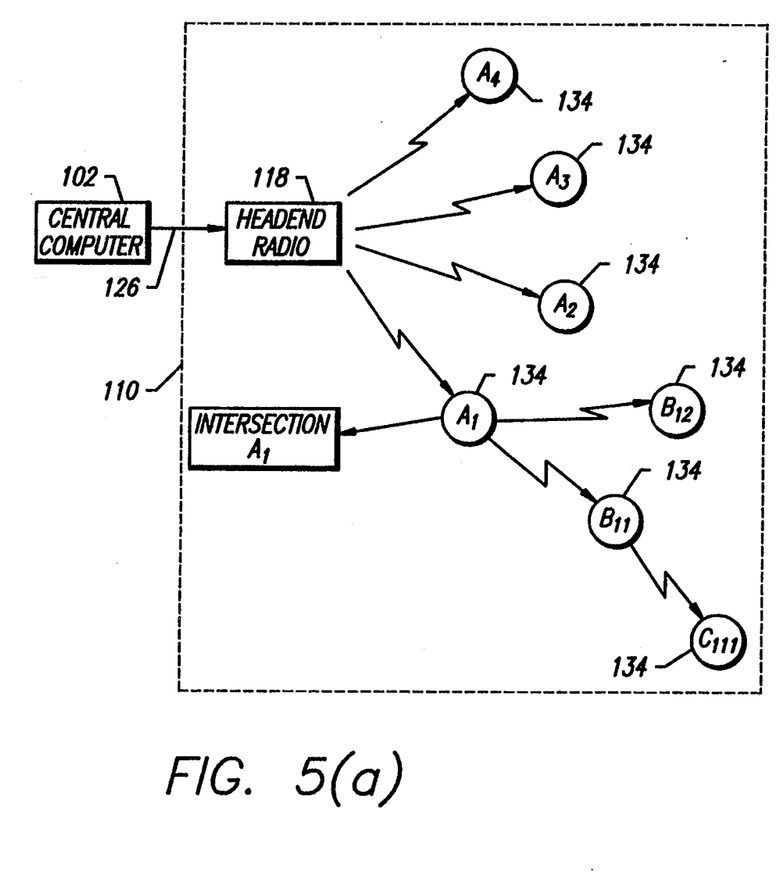
FIGS. 5a and 5b show the path of a concatenated data packet from the central computer to a designated remote radio and the path from the designated remote radio to the central computer, respectively.
Figure 5B:
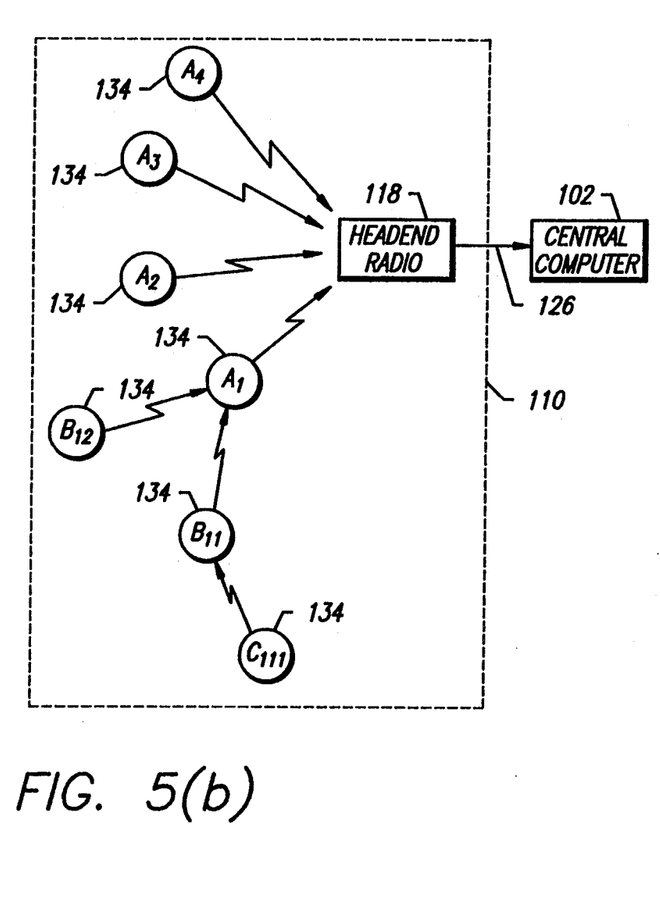

The remote radios 128, 130, 132 and 134 are organized in a specific hierarchy as is shown in FIGS. 1, and 5. Referring to network cell 110 in FIG. 1, it can be seen for illustration purposes only that the remote radios 134 are arranged at different levels. Each of the radios 134 incorporate the same design. Thus, the arrangement of radio levels is determined by monitoring for radio link contact between individual radios 134 within the network cell 110. The headend radio 118 is, by definition, located at the zero level. The radios in the next level of the hierarchy are referred to as A-level radios. The A-level radios are illustrated as remote radios $A_1$, $A_2$, $A_3$ and $A_4$ in FIGS. 1, 3 and 5. The radios in the level immediately below the A-level are referred to as the B-level radios. The B-level radios are shown as remote radios $B_{11}$, $B_{12}$, $B_{21}$, $B_{31}$ and $B_{32}$ in FIGS. 1 and 3. Finally, the radios in the level immediately below the B-level are referred to as C-level radios. The single C-level radio is shown as remote radio $C_{111}$ in FIGS. 1, 3 and 5.

The number of cells 104, 106, 108 and 110 in which the packet communication network 100 is partitioned is determined by a number of factors. These factors include: (a) the total number of remote radios 128, 130, 132 and 134; (b) the nominal amount of data being sent to and received from each remote radio 128, 130, 132 and 134; and (c) the geographical distribution of the remote radios 128, 130, 132 and 134. Multiple frequency channels are available to avoid interference between adjacent network cells 104, 106, 108 and 110. Further, frequencies are reused to form large networks since the radio frequency transmissions are at low power and confined to small geographical areas. Data transfer within each network cell 104, 106, 108 and 110 is characterized as an outbound/inbound transaction between the headend radios 112, 114, 116 and 118 and their respective remote radios 128, 130, 132 and 134.

An illustration of the control and monitoring functions of the adaptive protocol of the packet communication network 100 of the present invention is in the application to a traffic light system. In a traffic light system, inductive loops are buried in the payment of the roadway intersection. The inductive loop serves to sense the presence of a vehicle as is known in the art. The inductive signals that are generated in the loop are converted to data which represents vehicle count, traffic density and speed. Upon being transmitted to the central computer 102, the data is used to characterize the traffic flow. Based upon the traffic flow patterns determined from the data, the central computer 102 formulates traffic signal timing plans. The traffic signal timing plans are transmitted from the central computer 102 to the remote radio associated with the individual traffic lights at one second time intervals.

The information contained in the timing plans indicates what the appropriate status of the individual traffic lights should be (e.g., which should be green and which should be red). Thus, the control function of the central computer 102 is to coordinate the timing of multiple traffic lights in an area. An on-street traffic light controller (not shown) associated with each traffic light transmits a monitoring signal to the central computer 102 once each second to indicate the status of the traffic light. Therefore, the control function of each of the remote radios 128, 130, 132 and 134 is to control a single traffic light. Each of the remote radios 128, 130, 132 and 134 is a microprocessor based system that performs monitoring and control of the local on-street traffic light controller. This feature provides the monitoring and verification function of the packet communication network 100.

Figure 2:
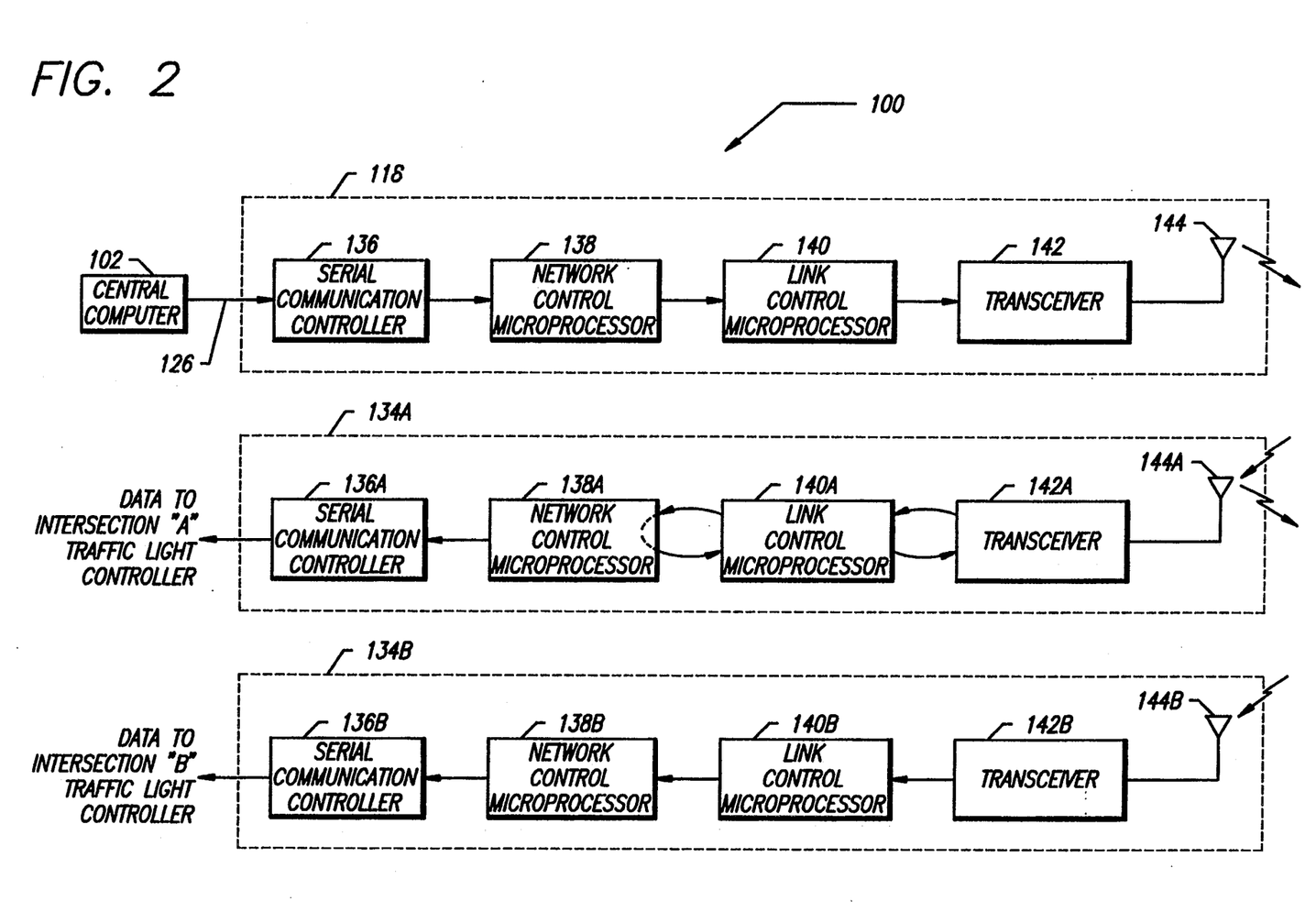
FIG. 2 is a simplified block diagram of the adaptive protocol for communications network of FIG. 1 showing the structure of a headend radio and of a pair of remote radios.

A block diagram of the packet communication network 100 which embodies the invention is shown in FIG. 2. The central computer 102, which serves as a host device, is shown communicating with one of the headend radios, for example, headend radio 118 over cable 126. The headend radio 118 is also shown communicating with a pair of remote radios 134. One of the pair of remote radios is an A-level radio and thus is identified on FIG. 2 as remote radio 134A. The second of the pair of remote radios is a B-level radio and is identified as remote radio 134B. Remote radio 134A is connected to traffic light controller "A" and serves to relay data to B-level radios supported by radio 134A. Likewise, remote radio 134B is connected to traffic light controller "B" and serves to relay data to C-level radios supported by radio 134B, if any. Each of the radios including the headend radio 118 and the two remote radios 134A and 134B are identical in structure. Therefore, the general structure and function of only one of the radios will be described in detail.

Each of the radios 118, 134A and 134B includes a serial communication controller 136, 136A and 136B, respectively, which serves as an input/output port. Controller 136 serves as an input/output port between the central computer 102 and radio 118 while controllers 136A and 136B serve as input/output ports between the respective traffic light controllers "A" and "B" and radios 134A and 134B, respectively. During the transmit or relay mode, the serial communication controller 136 receives command/control data from the central computer 102 in the form of a concatenated message block. Thereafter, the various clocking and timing pulses are implemented and the concatenated message block is held in short term storage until the next stage of transmit processing is prepared to receive the concatenated message block.

The concatenated data block is then transmitted from the controller 136 to a network control microprocessor 138 during the transmit or relay mode. The network control microprocessor 138 serves to generate a concatenated outbound RF transmission data packet for transmission to the remote radios 134A and 134B shown on FIG. 2. The construction of the concatenated outbound RF transmission data packet is discussed in more detail hereinbelow in conjunction with FIG. 8. The microprocessor 138 then determines each of the receive and transmit assignments of all the remote radios 134A and 134B in the network 100.

Thereafter, the microprocessor 138 appends to the outbound RF transmission data packet a set of receive and transmit time offset commands for only the A-level radios (e.g., radio 134A in FIG. 2). These commands include, for example, transmission time slots assignments, channel access control commands and destination or addressee codes. The assignment commands control which remote radio can transmit and receive messages during the available time slots. The parameters employed to determine which remote radio can transmit and receive and when the transmission or reception can occur include the level in the architectural hierarchy at which the remote radio is operating and the length of the message transmission. Additionally, the destination or addressee code appended to the concatenated data packet permits the individual messages to be filtered out by the remote radios 134A and 134B.

The outbound RF transmission data packet is then transmitted to a link control microprocessor 140 in the transmit or relay mode as shown in FIG. 2. The link control microprocessor 140 applies forward error correction coding to the outbound RF transmission data packet to minimize the effect of data errors prior to transmission. Additionally, the link control microprocessor 140 accomplishes a plurality of assignment tasks prior to the transmission of the outbound RF data packet. The assignments include, for example, scheduling a time slot for transmission of the outbound data packet on an RF channel, assigning an RF transmission frequency, providing a control signal to instruct a transceiver 142 to switch to the transmit mode and receiving a ready-to-receive response signal from the transceiver 142. Thereafter, the link control microprocessor 140 transmits the data of the outbound RF transmission data packet to the transceiver 142.

The outbound transmission RF data packet is received by the transceiver 142. In the transmit or relay mode, the transceiver modulates the serial data comprising the outbound data packet onto an RF carrier wave as is known in the art. Thereafter, an omnidirectional antenna 144 transmits the RF carrier wave modulated with the concatenated data packet from the headend radio 118 to each local A-level remote radios (e.g., radio 134A in FIG. 2) in network cell 110 in a single transmission.

The RF carrier wave modulated with the concatenated data packet is received at an omnidirectional antenna 144A of the A-level radio 134A as shown in FIG. 2. The RF carrier wave is then transmitted to a transceiver 142A where it is subjected to receive processing. The RF carrier wave is demodulated as is known in the art to provide an inbound concatenated data packet. The inbound data packet is then transmitted to a link control microprocessor 140A. In the receive mode, the link control microprocessor 140A accomplishes a plurality of assignment tasks for processing the incoming data packet. The assignments include, for example, scheduling the receive frequency within the transceiver 142A, instructing the transceiver 142A to monitor a specific RF channel, seeking out messages from the incoming concatenated data packet for the traffic light controller "A", and transmitting those messages to the link control microprocessor 140A. The link control microprocessor 140A then performs error detection and correction on the incoming data packet and discards only individual messages that are in error. The remainder of the incoming concatenated data packet that is valid and error free is transmitted to a network control microprocessor 138A.

In the receive mode, the network control microprocessor 138A of the A-level receives those portions of the concatenated message packet from the link control microprocessor 140A that were received without errors. The A-level microprocessor 138A extracts individual messages from the incoming concatenated data packet that include a destination or addressee code for the A-level host, e.g., the traffic light controller "A". Those messages are then transmitted to serial communication controller 136A which serves as an input/output port with traffic light controller "A".

Thereafter, the A-level microprocessor 138A extracts from the incoming concatenated message packet all messages for remote radios (e.g., remote radio 134B in FIG. 2) supported by the A-level remote radio 134A. The extracted messages addressed to the remote radios supported by A-level radio 134A are then reformatted and a set of receive and transmit time offset commands for only the B-level radios (e.g., radio 134B in FIG. 2) is appended thereto. These commands are similar to those appended to the outbound RF transmission data packet of headend radio 118 previously described. The microprocessor 138A then transmits the reformatted transmission data packet back to the link control microprocessor 140A. The link control microprocessor 140A, the transceiver 142A and the omnidirectional antenna 144A each function in a manner duplicate to the corresponding elements of the headend radio 118 during transmission as previously described. Thus, the A-level remote radio 134A serves to relay messages of the concatenated data packet from the headend radio 118 to the B-level remote radio 134B.

The omnidirectional antenna 144A transmits an RF carrier wave modulated in the transceiver 142A with the reformatted concatenated data packet from the A-level remote radio 134A to each of the local B-level remote radios (e.g., radio 134B in FIG. 2) in network cell 110 in a single transaction. The RF carrier wave modulated with the concatenated data packet is received at an omnidirectional antenna 144B of the B-level radio 134B as shown in FIG. 2. The RF carrier wave is then transmitted to a transceiver 142B where it is subjected to receive processing. The RF carrier wave is demodulated as is known in the art to provide an incoming concatenated data packet. The incoming data packet is then processed by a link control microprocessor 140B and a network control microprocessor 138B. Each of these elements functions in a manner duplicate to the corresponding elements of the A-level remote radio 134A discussed above. Those messages addressed to traffic light controller "B" are directed thereto by a serial communications controller 136B. If a C-level remote radio exists in the packet communications network 100, the B-level radio 134B switches from the receive to the transmit mode and repeats the procedure previously described for the A-level remote radio 134A.

Figure 3:
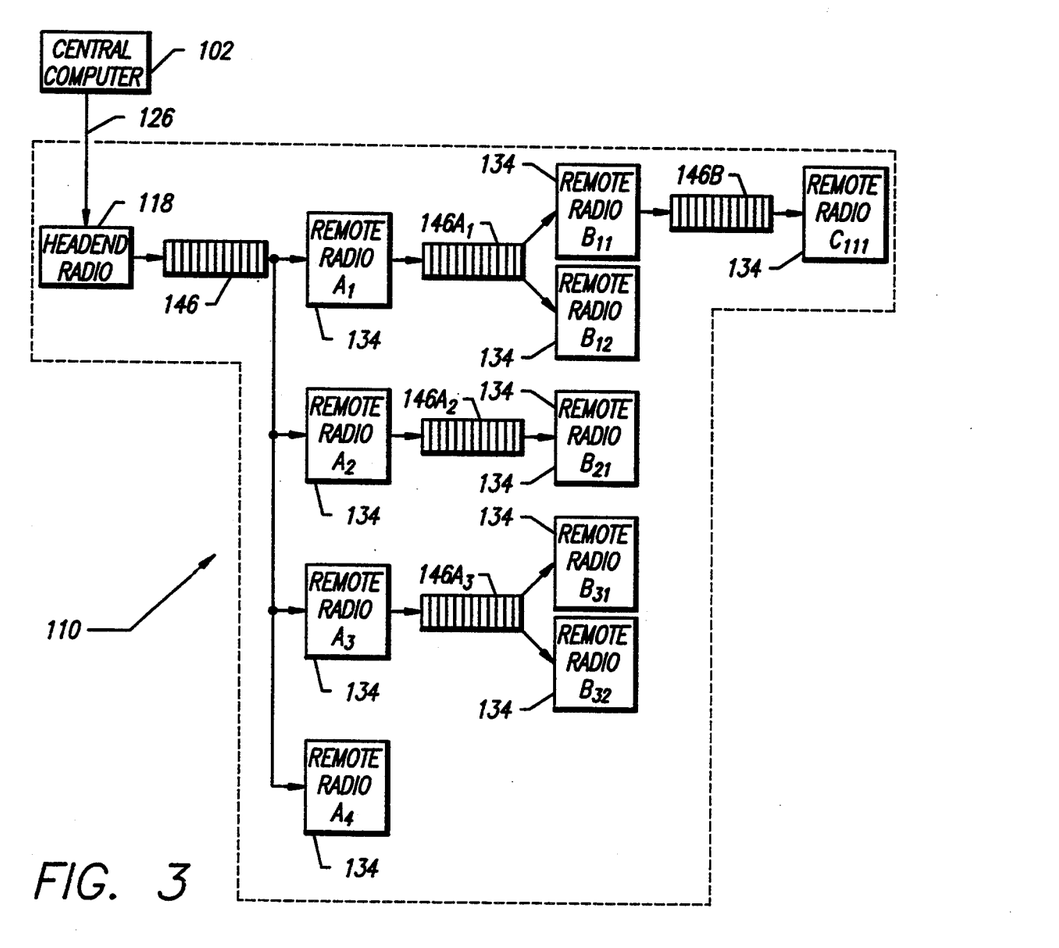
FIG. 3 is a data routing diagram showing the flow of data from the central computer to a level C remote radio.

A routing diagram of the concatenated data packet within the network cell 110 is shown in FIG. 3. The central computer 102 is shown transmitting the concatenated message block to headend radio 118 via cable 126. The headend radio 118 then transmits the concatenated data packet represented by the numeral 146 to each of the A-level remote radios $134A_1$, $134A_2$, $134A_3$ and $134A_4$. The A-level remote radio $134A_1$ then routes a data packet represented by the numeral $146A_1$ to the B-level remote radios $134B_{11}$ and $134B_{12}$. Thereafter, the B-level remote radio $134B_{11}$ routes a data packet represented by the numeral 146B to the C-level remote radio $134C_{111}$. Note that each of the concatenated data packets 146, $146A_1$ and 146B become progressively smaller. This is consistent with the fact that individual messages are filtered out of the data packet 146 and are transmitted to the appropriate traffic light controller at each level of the architectural hierarchy. Additionally, the A-level radio $134A_2$ routes a data packet represented by the numeral $146A_2$ to B-level radio $134B_{21}$. Finally, the A-level radio $134A_3$ transmits a data packet represented by the numeral $146A_3$ to B-level radios $134B_{31}$ and $134B_{32}$.

Another diagram illustrating the routing of the concatenated data packet within the packet communications network 100 is shown in FIGS. 5a and 5b. The transmit or relay mode is represented in FIG. 5a which is consistent with the illustrations in FIGS. 1 and 3. In FIG. 5a, the central computer 102 transmits the concatenated message block to the headend radio 118 of network cell 110 via cable 126. The concatenated data packet formed within the headend radio 118 at the zero level is broadcast via the omnidirectional antenna 144 to all remote radios 134 at the A-level. The broadcast data packet contains all the messages for every remote radio in the network cell.

At the A-level radio $134A_1$, the messages addressed to traffic light controller "$A_1$" are filtered out and transmitted thereto. Also, the messages addressed to each of the remote radios 134 that are supported by the A-level radio $134A_1$ are filtered out. All remaining messages addressed to other A-level radios not supported by radio $134A_1$ are discarded. The data packet reformatted in the A-level radio $134A_1$ is then broadcast to each of the B-level remote radios $134B_{11}$ and $134B_{12}$. The messages addressed to the respective traffic light controllers at the B-level are filtered out and transmitted to the respective intersections. Finally, the data packet reformatted in the B-level radio $134B_{11}$ is broadcast to the C-level remote radio $134C_{111}$. The messages addressed to the traffic light controller at the C-level are then filtered out and transmitted to the appropriate traffic light controller. Each remote radio at each level of the architectural hierarchy includes the omnidirectional antenna 144 to ensure that each local radio 134 in the particular network cell can detect the transmission broadcast.

Note that each of the radios in the example accompanying the description of FIG. 5a (e.g., headend radio 118, radio $134A_1$ and radio $134B_{11}$) broadcasts the entire concatenated data packet to each of the local remote radios supported by that broadcast radio. Therefore, only three outbound transmission broadcasts are required. In FIG. 5b, the transmissions are reversed and would occur when monitoring and verification signals are transmitted from the remote radios 134 to the central computer 102 via the headend radio 118. It is noted that seven inbound transmissions from the remote radios 134 are required under these conditions.

Each headend radio 112, 114, 116 and 118 has a limited data capacity. The limited data capacity controls the number of remote radios 128, 130, 132 and 134 at traffic intersections that can be supported. Nominally, each headend radio 112, 114, 116 and 118 can support approximately fifty remote radios at the data rate of one message per second per intersection. In order to support more than fifty intersections per headend radio 112, 114, 116 and 118, multiple network cells 104, 106, 108 and 110 are configured using frequency and geographical separation as shown in FIG. 1.

Figure 4A:
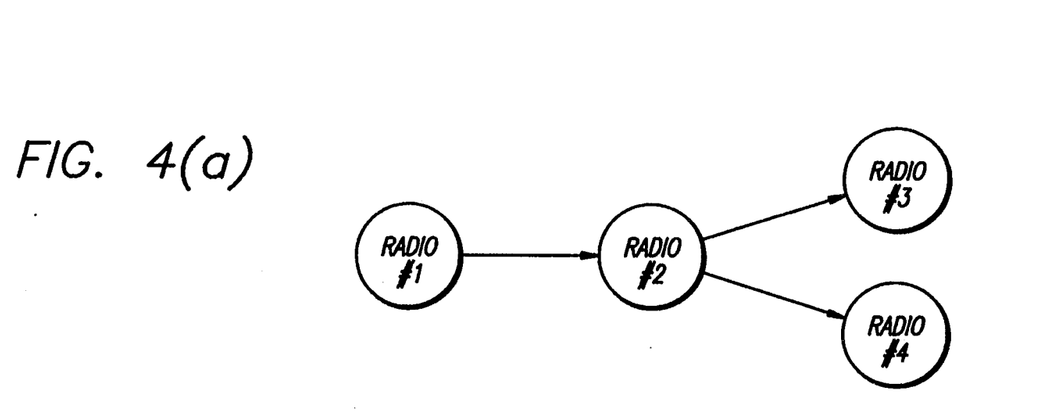
FIG. 4a is a connection diagram showing an exemplary connection between a plurality of radios.
Figure 4B:
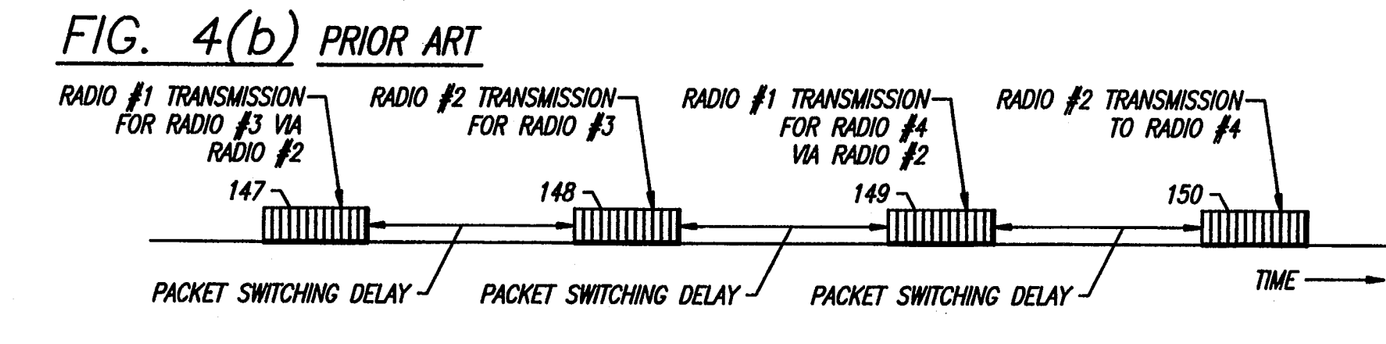

Transmission timing diagrams for the concatenated data packet are shown in FIG. 4. FIG. 4a represents an exemplary connection for a data packet transmission from radio #1 to radios #3 and #4 via radio #2 with one level of relaying. FIG. 4b illustrates a timing diagram of the transmission of a data packet for a prior art packet communication network. In a data packet transmission from radio #1 for radios #3 and #4, the following transmissions are required in the prior art network. A first data packet indicated by the numeral 147 represents a transmission from radio #1 to radio #3 via radio #2. A second data packet indicated by the numeral 148 represents a transmission from radio #2 to radio #3. In between the data packets 147 and 148 is a first packet switching delay. A packet switching delay is a time delay normally associated with the radio transceiver 142 switching between the receive and transmit modes. A third data packet indicated by the numeral 149 represents a transmission from radio #1 to radio #4 via radio #2. Also located between the data packets 148 and 149 is a second packet switching delay. A fourth data packet indicated by the numeral 150 represents a transmission from radio #2 to radio #4. Finally, located between the data packets 149 and 150 is a third packet switching delay. Thus, in the prior art packet communication network, three packet switching delays are required in order to transmit data from radio #1 to radios #3 and #4 via one level of switching.

Figure 4C:
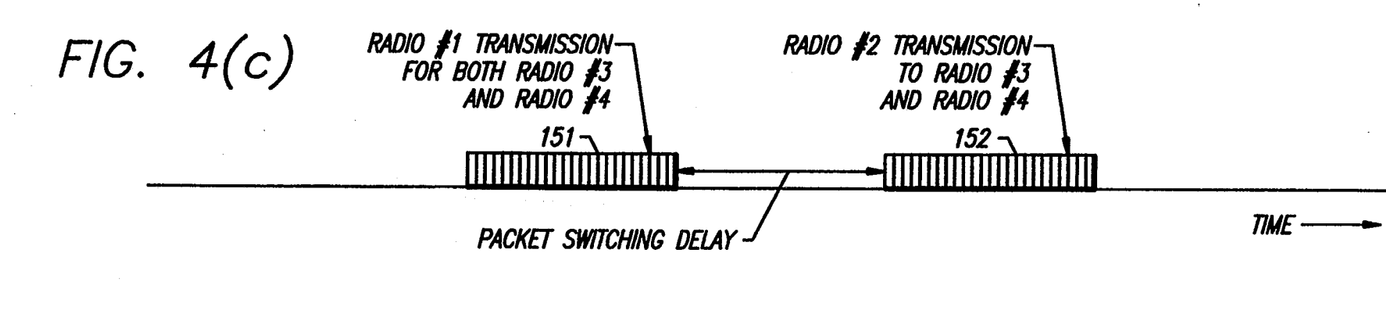

FIG. 4c illustrates a timing diagram of the transmission of a data packet employing the adaptive protocol of the packet communication network 100 of the present invention. In a data packet transmission from radio #1 to radios #3 and #4, the following transmissions are required. A first data packet indicated by the numeral 151 represents a transmission from radio #1 for both radios #3 and #4. A second data packet indicated by the numeral 152 represents a transmission from radio #2 to radios #3 and #4. Located between the data packets 151 and 152 is a packet switching delay. Thus, only a single packet switching delay is required in order to transmit data from radio #1 to radios #3 and #4. By utilizing the adaptive protocol for the packet switching network 100, the number of packet switching delays is minimized. The time associated with each packet switching delay is not insignificant and, in fact, consumes more time than the actual data packet transmission. Therefore, the time to transmit the concatenated data packet is reduced when using the inventive protocol.

Figure 6:
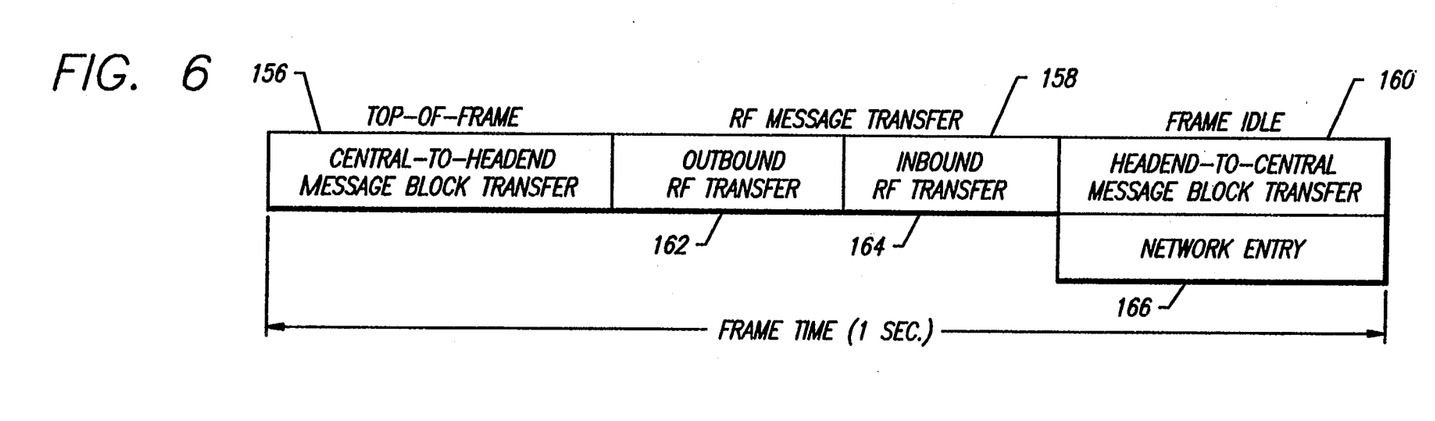
FIG. 6 is a protocol frame structure diagram showing a top-of-frame portion, an RF message transfer portion, and a frame idle portion.

The data rate of the packet communication network 100 of the present invention is one message per second per intersection. Each message is transmitted during a single time frame. A frame is defined as the time interval between messages to be transferred through the packet communication network 100 at the highest repetitive rate. For a network in which the fastest repetition rate of user messages is once per second, the frame size is one second. The structure of a frame 154 is illustrated in FIG. 6. Each frame 154 is partitioned into three sections which include a top-of-frame section 156, a radio frequency (RF) message transfer section 158, and a frame idle section 160.

The top-of-frame section 156 represents the time period during which the central computer 102 is transmitting the concatenated message block to the headend radios 112, 114, 116 and 118 over the serial communications interface established by the serial communications controller 136. The RF message transfer section 158 represents the outbound 162 (e.g., from headend radio 112, 114, 116 and 118) and inbound 164 (e.g., to headend radio 112, 114, 116 and 118) over-the-air message transmission cycle. Finally, the frame idle section 160 represents a period of time allocated to transferring messages from the headend radios 112, 114, 116 and 118 to the central computer 102 and for the solicitation and acceptance into the network 100 of new and lost remote radios 128, 130, 132 and 134. The network entry section is represented by the numeral 166 as shown in FIG. 6. The entire frame structure 154 has a repetition cycle of one second.

Figure 7:
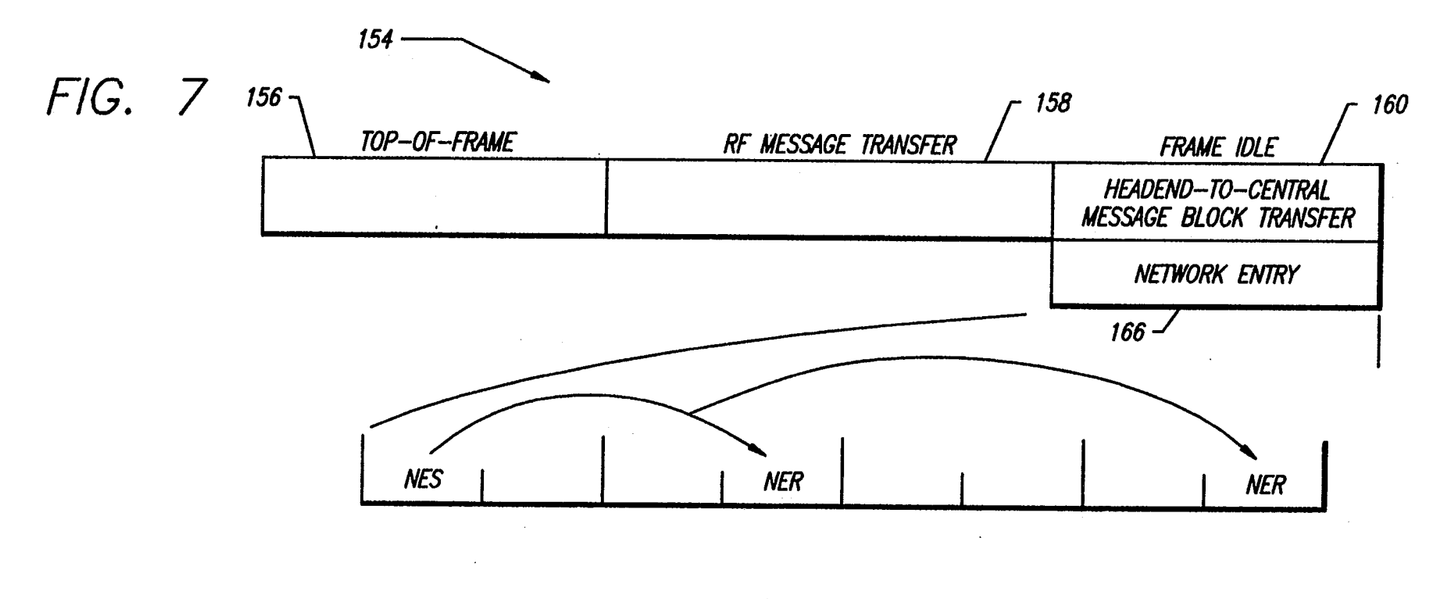
FIG. 7 is a more detailed diagram of the frame idle portion of the protocol frame structure of FIG. 6 showing a network entry solicitation (NES) message and a network entry request (NER) message.

The initial configuration of the network 100 is performed automatically and outwardly from the headend radios 112, 114, 116 and 118. A set of time intervals during the frame idle section 160 is utilized to support a round trip network entry solicitation and network entry request transaction between a radio 128, 130, 132 and 134 active in the network 100 and a radio attempting to enter the network 100. The headend radios 112, 114, 116 and 118 each generate a network entry solicitation (NES) message in every frame 154 as shown in FIG. 7. The A-level radios 128, 130, 132 and 134, which have direct radio frequency contact with the headend radios 112, 114, 116 and 118, receive the NES messages. The A-level radios 128, 130, 132 and 134 respond to the NES messages with network entry request (NER) messages.

In order to avoid contention between the radios, the identification (e.g., ID) of a radio is employed to determine which time slot interval is to be used for the NER message. Radios active in the network generate NES messages that define the key parameters required by a radio to enter the network 100. A radio receiving an NES message will use its assigned ID to compute an affect to avoid contention when multiple radios respond to the same NES message. The timing associated with this round trip network entry solicitation and entry request transaction is shown in FIG. 7.

The selection of which NES message is to be used when multiple NES messages are detected is based upon level. Thus, A-level radios are in direct radio contact with the headend radios 112, 114, 116 and 118, B-level radios are one level of radio contact removed from the headend radios 112, 114, 116 and 118, and C-level radios are two levels removed. Remote radios 128, 130, 132 or 134 attempting to enter a network cell 104, 106, 108 or 110 will monitor for NES messages for a period of time before attempting network entry. This will provide the radio with an adequate sample period to minimize unnecessary relaying and to distribute relay support among radios at the same level. Once the A-level radios have entered the network, they will begin to transmit NES messages which are detected by the B-level radios.

The radio attempting entry into the network 100 initiates a timer after generation of a NER message to timeout the receipt of addressed outbound message traffic. If an outbound message addressed to a new entrant is received prior to the timer expiration, the new radio will begin to participate as a member of that network cell. If the timer expires before entry is achieved, the radio will attempt entry through an alternate radio, if one exists. Otherwise, the radio will revert back to monitoring for NES messages. An active radio that receives an NER message checks the address field of the message for the ID. If the radio is the addressee, the active radio will begin the entry support process.

The active radio generates an Add Member Update message containing the entrant ID that will be sent to those radios closer to the headend radio 112, 114, 116 or 118 along the relay path between the solicitor radio and the headend radio during the next inbound transmit opportunity. A radio that receives an Add Member Update message will enter the entrant ID on its support list. The support list is used to filter outbound traffic. Radios will only forward message traffic for those remote radios 128, 130, 132 and 134 entered on its support list. When the headend radio 112, 114, 116 or 118 receives an Add Member Update message, it will begin to transmit outbound command data for the new member.

If a remote radio has not received any outbound messages containing its address for greater than "n" consecutive frames 154, it will begin monitoring for NES messages and attempt reentry into the network 100. If a remote radio does not receive any inbound messages from a radio that it is directly supporting for greater than "n" consecutive frames 154, it will delete the radio from its support list and alert radios toward the headend radio of the failure. During the network entry process, a radio will initially monitor its primary frequency channel. If unsuccessful at the attempt to reenter the network 100, it will monitor other frequency channels for NES messages. If the headend radio has been reprogrammed to a different frequency channel or if the headend radio fails, the lost remote radios can enter the network 100 on a different frequency channel or cell.

Figure 8:
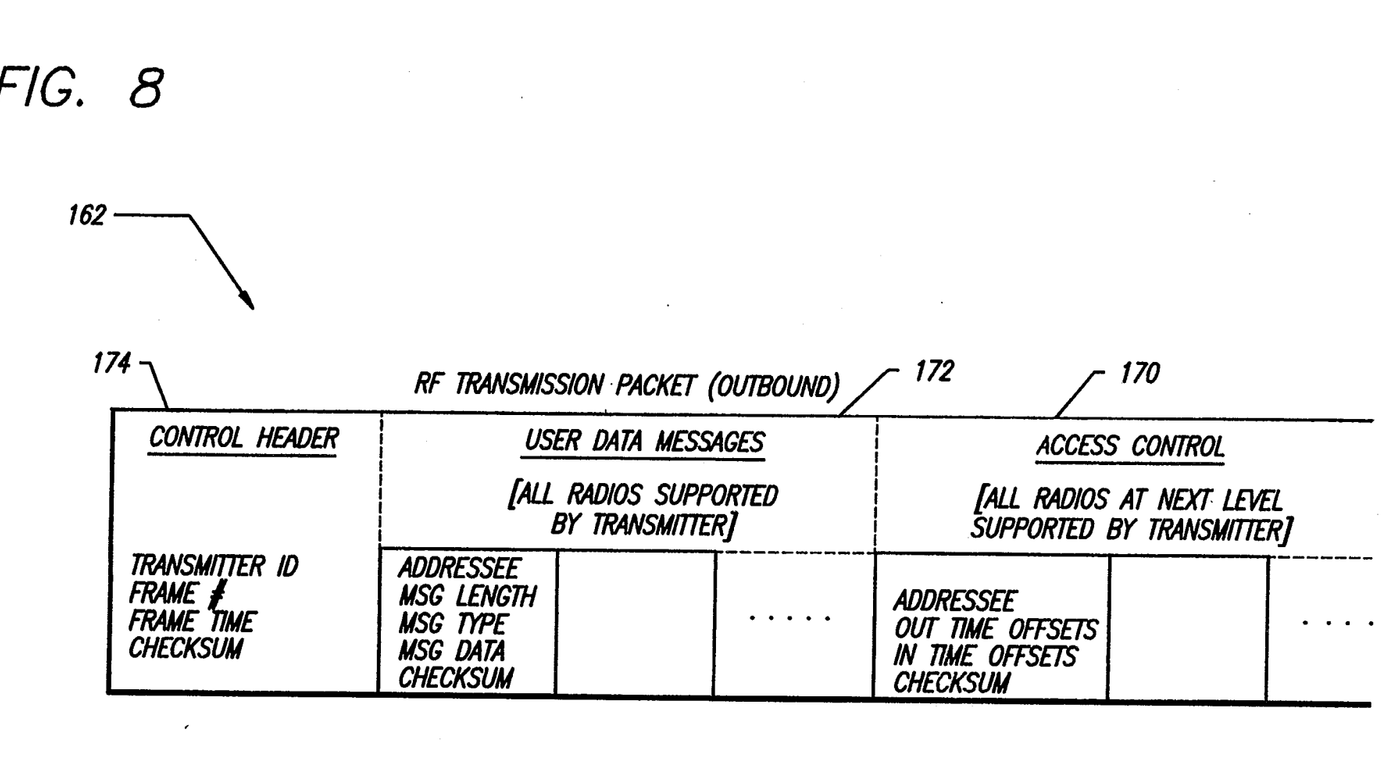
FIG. 8 is a simplified diagram of the message transport protocol for outbound data transfer.

Message transport protocols provide controlled outbound/inbound data transfer for each cell 104, 106, 108 and 110. The transfer cycle for the outbound RF data transfer 162 and the inbound RF data transfer 164 occurs within the one second frame as shown in FIG. 6. An illustration of the outbound RF transmission data packet 162 is shown in FIG. 8. The outbound flow of data is initiated by the transfer of data from the central computer 102 to the headend radios 112, 114, 116 and 118. The headend radios 112, 114, 116 and 118 receive command/control data from the central computer 102 via the concatenated message block. The message block is a concatenation of all outbound user messages for the particular frame 154 from the central computer 102 to all the remote radios 128, 130, 132 and 134 in the cell 104, 106, 108 and 110.

The channel access control commands identified by the numeral 170 that are appended to the concatenated message block by the headend radios 112, 114, 116 and 118 to form the outbound RF transmission data packet are shown in FIG. 8. The channel access control commands 170 contain a set of time offsets in one millisecond increments for each A-level outbound and inbound transmission. The time offsets are computed based on the radio link connectivity used to build the network cell 104, 106, 108 or 110, the size of the concatenated data packet, and the static delays associated with a radio switching from the receive to the transmit mode. The new set of channel access control commands 170 that contain the time offsets for the B-level radios once the A-level radios transmit the outbound RF transmission data packet is also provided by the in and out time offsets shown in FIG. 8.

A checksum contained by all of the individual messages in the outbound RF transmission data packet 162 is also shown in FIG. 8. The check sum ensures that only individual messages are discarded in the case of bit errors. Both the user data message section, identified by the numeral 172, and the access control section 170 include an addressee code to identify the designated recipient of the message. The user data message section 172 also includes information regarding the length, type and data of the message. It is further noted that the time slots allocated in the data message section 172 for the transmission of the data packet are based on the size of the messages to be transmitted and the dynamic message load entering the network 100. The outbound RF transmission data packet 162 also includes a control header section 174. The control header section 174 includes information including the transmitter ID, the number and time of the frame 154 and the checksum.

Since the adaptive protocol for the packet communication network 100 can manipulate multiple concatenated messages between the central computer 102 and the remote radios 128, 130, 132 and 134 located at different destinations as a single transaction, the time for delivering the periodic data packet is minimized and data transmissions are faster. Further, the network 100 has the ability to support a greater number of remote radios for a single central computer 100 with the same frequency bandwidth allocation. A greater number of supported remote radios results in a larger concatenated data packet having greater message density. Further, the adaptive protocol of the present invention only requires several milliseconds for each relay transmission between levels of remote radios.

Thus, the present invention has been described herein with reference to a particular embodiment for a particular application. Those having ordinary skill in the art and access to the present teachings will recognize additional modifications, applications and embodiments within the scope thereof. Although the detailed description is directed to a packet communication network as applied to a traffic light control system, the present invention is equally applicable to the control of military ordnance systems.

It is therefore intended by the appended claims to cover any and all such modifications, applications and embodiments within the scope of the present invention.

Accordingly,

What is claimed is:

1. A packet communications network comprising:
   means for generating a concatenated data packet containing a plurality of messages for transmission to a plurality of radios in said network;
   means for appending a first set of assignment commands for controlling which radio in a first set of radios of said plurality of radios can transmit and receive and destination codes to said concatenated data packet to form said first concatenated data packet;
   means for transmitting said first concatenated data packet to said first set of radios of said plurality of radios in a single transmission;
   means for extracting messages from said first concatenated data packet for said first set of radios;
   means for appending a second set of assignment commands for controlling which radio in a second set of radios of said plurality of radios can transmit and receive and destination codes to said first concatenated data packet to form said second concatenated data packet; and means for relaying said second concatenated data packet to said second set of radios of said plurality of radios in a single transmission.

2. The packet communication network of claim 1 wherein said means for generating said concatenated data packet includes a first network control microprocessor.

3. The packet communication network of claim 1 wherein said first means for transmitting said concatenated data packet includes an omnidirectional RF antenna.

4. The packet communication network of claim 1 wherein said second means for relaying said concatenated data packet to said second set of radios is a second network control microprocessor.

5. The packet communication network of claim 1 further including means for applying forward error correction coding to said first concatenated data packet prior to transmission.

6. The packet communication network of claim 5 wherein said means for applying forward error correction coding to said first concatenated data packet is a link control microprocessor.

7. The packet communication network of claim 1 further including means for modulating and demodulating said concatenated data packet.

8. The packet communication network of claim 7 wherein said modulating and demodulating means comprises a transceiver.

9. A method for routing data through a packet communication network, said method comprising the steps of:

generating a concatenated data packet containing a plurality of messages for transmission to a plurality of radios in said network;

appending a first set of assignment command for controlling which radio in a first set of radios of said plurality of radios can transmit and receive and destination codes to said concatenated data packet;

transmitting said concatenated data packet to said first set of radios of said plurality of radios in a single transmission;

extracting messages from said concatenated data packet for said first set of radios;

appending a second set of assignment commands for controlling which radio in a second set of radios of said plurality of radios can transmit and receive and destination codes to said concatenated data packet; and relaying said concatenated data packet to said second set of radios of said plurality of radios in a single transmission.

10. The method of claim 9 further including the step of determining the receive and transmit assignments for each of said plurality of radios in said network.

11. The method of claim 9 further including the step of applying forward error correction coding to said concatenated data packet prior to transmission.

12. The method of claim 9 further including the step of scheduling said concatenated data package for transmission on an RF channel.

13. The method of claim 9 further including the step of receiving and processing said first concatenated data packet at each of said first set of radios.

14. The method of claim 9 further including the step of performing error detection and correction to said first concatenated data packet at said first set of radios.

15. The method of claim 9 further including the step of appending a checksum bit to said concatenated data packet for identifying individual erroneous messages of said data packet.

16. The method of claim 9 further including the step of discarding individual erroneous messages of said concatenated data packet.

17. The method of claim 9 further including the step of reformatting said second concatenated data packet prior to relaying said data packet to said second set of radios.

* * * * *